United States Patent [19]
Dellande et al.

[11] Patent Number: 4,458,206
[45] Date of Patent: Jul. 3, 1984

[54] CIRCUIT FOR SYNCHRONIZING THE DEMODULATION OF PHASE MODULATED TRANSMISSION BURSTS

[75] Inventors: Brian W. Dellande, Austin, Henry Wurzburg; Round Rock, both of Tex.

[73] Assignee: Motorola, Inc., Schaumburg, Ill.

[21] Appl. No.: 332,408

[22] Filed: Dec. 21, 1981

[51] Int. Cl.$^3$ .............................................. H04L 27/22
[52] U.S. Cl. ...................................... 329/50; 329/110; 375/83; 375/104; 375/110
[58] Field of Search .................. 329/50, 107, 110, 111; 375/44, 45, 46, 47, 49, 52, 55, 56, 78, 79, 80, 82, 83, 84, 87, 88, 90, 110, 111, 113

[56] References Cited

U.S. PATENT DOCUMENTS

| | | | |
|---|---|---|---|
| 3,571,712 | 3/1971 | Hellwarth et al. | 375/103 X |
| 3,654,492 | 4/1972 | Clark | 375/113 X |
| 3,656,064 | 4/1972 | Giles et al. | 375/80 X |
| 4,019,149 | 4/1977 | Kustka et al. | 375/84 X |

FOREIGN PATENT DOCUMENTS

| | | |
|---|---|---|
| 2205792 | 5/1974 | France . |
| 56-0161451 | 3/1981 | Japan . |
| 56-0032847 | 6/1981 | Japan . |
| 56-0039652 | 6/1981 | Japan . |
| 2020132 | 11/1979 | United Kingdom . |

OTHER PUBLICATIONS

Nosaka, K. et al., "PSK Demodulator with Delay Line for the PCM-TDMA System", IEEE Trans. Commun. Tech., vol. COM-18, No. 4, pp.427-434, Aug. 70.
Waggener, W., "Designer's Guide to Digital Synchronization Circuits, Part I", EDN, vol. 21, No. 14, pp. 56-61, Aug. 76.

*Primary Examiner*—Siegfried H. Grimm
*Assistant Examiner*—W. R. Paxman
*Attorney, Agent, or Firm*—Anthony J. Sarli, Jr.; Jeffrey Van Myers; Robert L. King

[57] ABSTRACT

An energy synchronized demodulator circuit is disclosed having a differential input to single ended converter coupled to a sync detect circuit which provides a detection signal in response to the modulated input signal. The detection signal is integrated over time, and a threshold detector provides an output when the detection signal exceeds a predetermined threshold level. A filter provides a constant level output signal indicative of the presence of valid data. Synchronized demodulation is provided by a correlation between phase or frequency in predetermined bit intervals of the detection signal. Synchronization is initiated by the initial burst of input signal energy received by the differential input.

8 Claims, 2 Drawing Figures

CIRCUIT FOR SYNCHRONIZING THE DEMODULATION OF PHASE MODULATED TRANSMISSION BURSTS

TECHNICAL FIELD

This invention relates generally to demodulator circuits and, more particularly, to a demodulator circuit which is synchronized with a modulated signal by the energy of the modulated signal.

BACKGROUND ART

Generally, a demodulator must be synchronized with a modulated data stream input signal to provide a valid output. Previous methods for acquiring synchronization with a modulated signal include the continuous transmission of a carrier signal having embedded sync bits in a fixed pattern which can be used to synchronize the demodulator. A severe limitation of using a carrier signal with a sync pattern is the fact that the pattern occupies a long time period and delays demodulation of the data stream. Another method for acquiring synchronization is to add a start bit at the beginning of the data stream signal. However, not only does a start bit require an extra bit for each data signal, most applications typically use several stop bits which require additional bits.

SUMMARY OF THE INVENTION

Accordingly, an object of the present invention is to provide an improved demodulator circuit which is synchronized by the presence of energy of a modulated signal.

Another object of the present invention is to provide an improved synchronized demodulator circuit which detects sync with a modulated signal and which is faster than demodulator circuits of the prior art.

In carrying out the above and other objects and advantages of the present invention, there is provided, in one form, input means for providing a single ended output from a modulated two line input of a 2, 4 or 6 wire telephone system. A sync detect circuit is coupled to the output of the input means and provides a detection signal by detecting synchronization with the occurrence of the initial burst of signal energy from the line. The detection signal is integrated by a counter to provide an integration signal which is coupled to a threshold detector and decoded from the counter. The threshold detector provides a sync detect signal when the integration signal exceeds a predetermined level. The sync detect signal is coupled to a filter to provide a valid data signal which indicates the acquisition of synchronization of the demodulator with the modulated signal. A correlator is coupled to the sync detect circuit which uses the detection signal to provide valid data bits. The valid data bits are stored until the occurrence of the valid data signal.

The above and other objects, features and advantages of the present invention will be more clearly understood from the following detailed description taken in conjunction with the accompanying drawings.

DESCRIPTION OF THE PREFERRED EMBODIMENT

Figure 1:
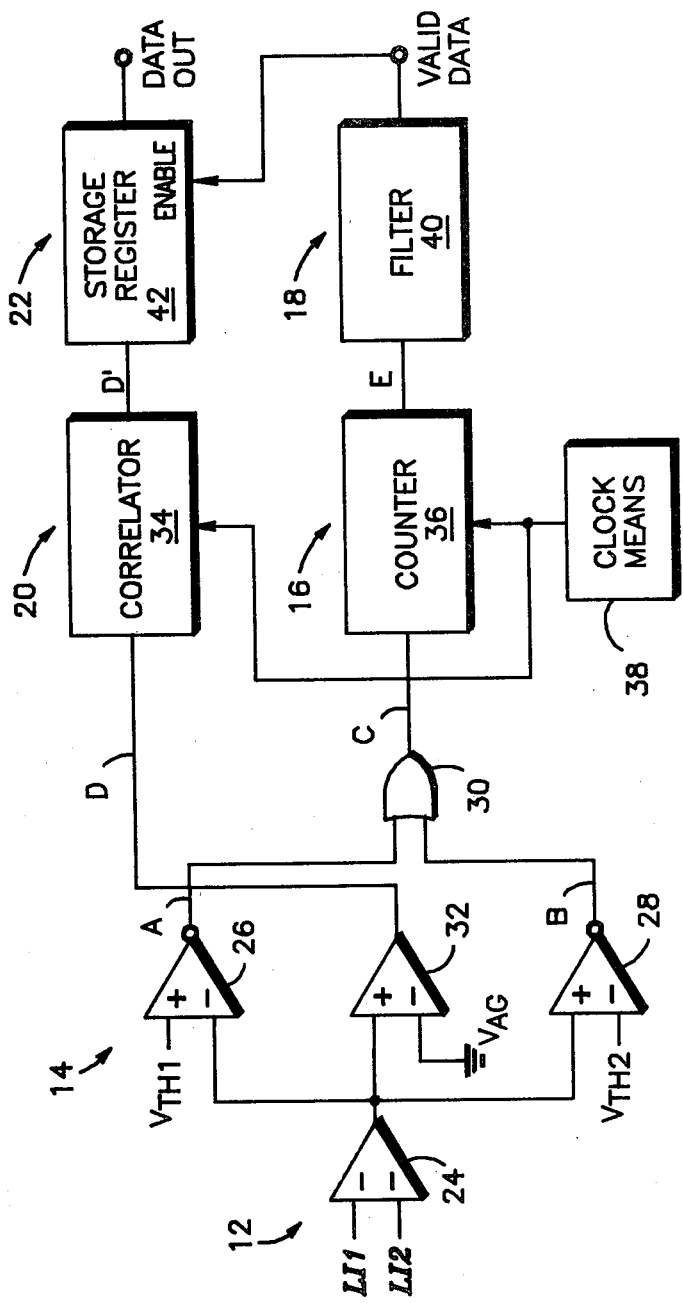
FIG. 1 illustrates in block diagram form an energy synchronized demodulator circuit constructed in accordance with the preferred embodiment of the present invention.
Figure 2:
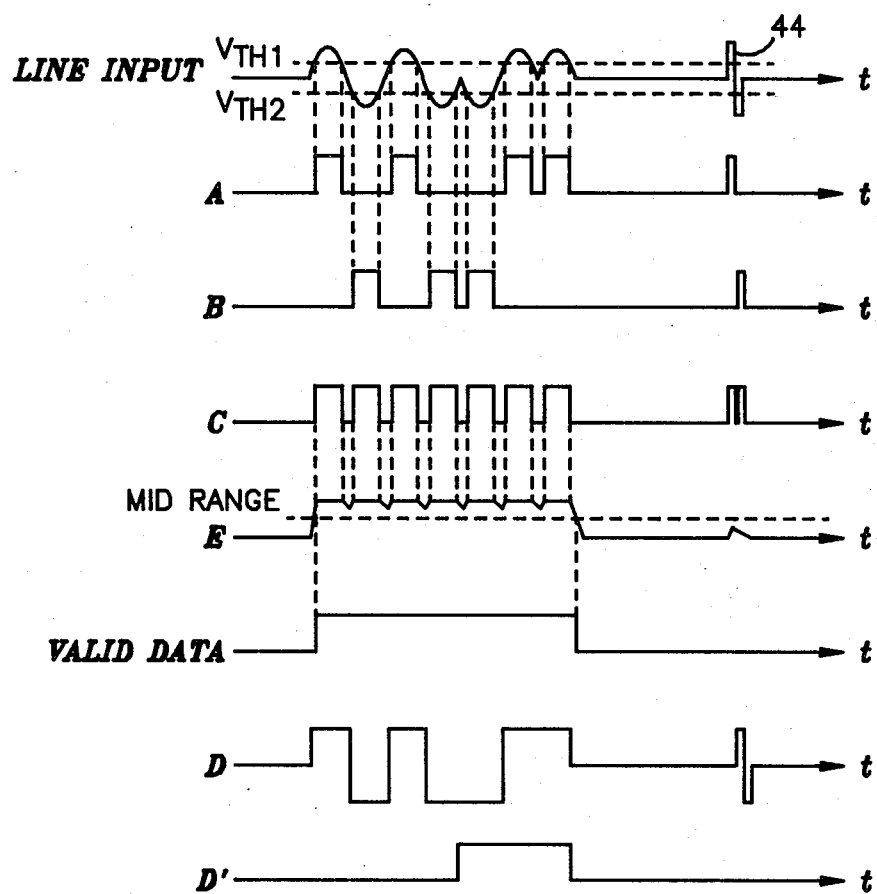
FIG. 2 is a graphic timing diagram for the energy synchronized demodulator circuit of FIG. 1.

Shown in FIG. 1 is an energy synchronized demodulator circuit 10 constructed in accordance with the preferred embodiment of the present invention. Synchronized demodulator circuit 10 is comprised generally of a differential to single ended conversion input portion 12, a window detection portion 14, an integration and threshold detect portion 16, a pulse shaping portion 18, a correlation portion 20 and a storage portion 22. Input portion 12 is comprised of an operational amplifier 24 which has an output, a first input coupled to a first line input signal, LI1, and a second input coupled to a second line input signal, LI2. Line input signals LI1 and LI2 represent a modulated signal shown in FIG. 2 from a modulator (not shown) and, in a preferred embodiment, represent two lines of a 2, 4 or 6 wire telephone system. The modulated signal shown in FIG. 2 illustrates the conventional Differential Phase Shift Keying (DPSK) modulation which utilizes phase relationship between bit intervals. In other words, in a binary system, a phase reversal at the completion of one cycle indicates a binary "1" and no phase reversal indicates a binary "0".

In window detection portion 14, a comparator 26 has a first input coupled to the output of operational amplifier 24, and a second input coupled to a positive threshold voltage level, $V_{TH1}$. A comparator 28 has a first input coupled to both the first input of comparator 26 and the output of operational amplifier 24, and a second input coupled to a negative threshold voltage level $V_{TH2}$. An output of comparator 26 for providing an inverted output provides a signal A which is coupled to a first input of an OR gate 30. An output of comparator 28 for providing an inverted output provides a signal B which is coupled to a second input of OR gate 30. The output of OR gate 30 provides a first detection signal C. A comparator 32 has a first input coupled to the first inputs of comparators 26 and 28 and to the output of operational amplifier 24. Comparator 32 has a second input coupled to a reference voltage, say analog ground, $V_{AG}$, and an output coupled to a correlator circuit 34. The output of comparator 32 provides a second detection signal D.

In integration and threshold detect portion 16, an up-down counter 36 has an input coupled to the output of OR gate 30 and an output coupled to pulse shaping portion 18. A clock signal generated by conventional clock means 38 is coupled to up-down counter 36. In a preferred embodiment, up-down counter 36 is a conventional counter circuit capable of counting at varying rates. Counter 36 functionally provides an integration signal whose level is an integration over time of a digital input signal and provides an output sync detect signal E when the integration signal exceeds a predetermined threshold level.

In pulse shaping portion 18, an input of a digital filter 40 is coupled to the output of up-down counter 36. Filter 40 represents a conventional digital filter which is functionally capable of providing a constant level output signal as long as a time varying input signal applied thereto remains above a predetermined threshold level for a predetermined amount of time. Included in filter 40 is conventional circuitry for performing an algorithm which calculates the timing and duration of the sync detect signal E and for validating the synchronization. The output of filter 40 is a signal which represents the presence of synchronized valid data.

In correlation portion 20, correlator 34 has the clock signal of clock means 38 coupled thereto. An output of correlator 34 which provides a signal D' is coupled to an input of storage portion 22 which comprises a storage register 42. In a preferred embodiment, correlator 34 is a conventional circuit (not shown) capable of detecting either a phase or a frequency relationship between predetermined bit intervals of a modulated input signal and providing a digital signal indicative of the phase or frequency relationship for each of the bit intervals. When DPSK modulation is used, the modulated input signal is sampled during consecutive cycles and the samples are then compared to correlate a change in phase. Therefore correlator 34 may be implemented by selectively coupling the samples to an exclusive OR logic gate. The output signal D' of correlator 34 represents valid demodulated data which is stored by storage register 42.

In operation, the line input signal shown in FIG. 2 is coupled to the inputs of operational amplifier 24. The threshold levels $V_{TH1}$ and $V_{TH2}$ are predetermined at some positive and negative level, respectively. For each portion of the line input signal which is more positive than $V_{TH1}$, comparator 26 provides a pulse shown as signal A. Similarly, for each portion of the line input signal which is more negative than $V_{TH2}$, comparator 28 provides a pulse shown as signal B. Thus, comparators 26 and 28 and OR gate 30 function as a window detector to receive the modulated input line signal and provide a detection signal. The window includes all voltage levels more positive than $V_{TH1}$ and all voltage levels more negative than $V_{TH2}$, thereby excluding the values between the threshold levels. The output of OR gate 30 shown as detection signal C is the combination of pulses from signals A and B. Up-down counter 36 functions as both an integrator and a threshold detector. After detection signal C is received, up-down counter 36 begins counting up the length of the presence of detection signal C at a first predetermined rate. If detection signal C remains present until up-down counter 36 counts up to a mid-range value or a synchronization threshold level, then threshold detection means in up-down counter 36 provide a constant level sync detect signal E. When detection signal C is not present between pulses, up-down counter 36 still provides a sync detect signal E which is above the predetermined mid-range level. Between the pulses of detection signal C, up-down counter 36 begins counting down at a second predetermined rate. The second predetermined rate is slower than the first count rate so that the synchronization threshold level is not reached during the intervals between pulses of data of detection signal C. Since the level of sync detect signal E is constantly changing, signal E is coupled to filter 40 which provides a valid data signal of constant predetermined level whenever sync detect signal E is greater than the synchronization threshold level.

In pulse shaping portion 18, before filter 40 provides the valid data signal, an algorithm is performed by conventional logic circuitry (not shown) to validate the presence, timing and duration of sync detect signal E. The algorithm is implemented by a circuit which times the presence of sync detect signal E and determines whether or not the duration of sync detect signal E is within a predetermined percentage of the duration of the modulated line input signal. Thus the purpose of the algorithm is to validate sync detect signal E and determine whether or not signal E resulted only from a continuous flow of noise on the line input. The algorithm also insures that the valid data signal is not interrupted in case signal E drops below the mid range level for one cycle because of noise interference during the presence of the modulated input signal.

Typically, every modulator/demodulator system must prevent noise from interrupting synchronization and proper data transmission. In an example shown in FIG. 2, a noise pulse 44 is present on the line input. In a telephone system, transformer action will produce both a positive and a negative pulse at the line input. Therefore, first detection signal C has two pulses generated at the output of OR gate 30 by a single noise spike. However, up-down counter 36 never counts up to the synchronization threshold level, and as a result, filter 40 never provides a valid data signal. Therefore, demodulator circuit 10 is insensitive to short duration noise interference.

Synchronization of the line input signal with the demodulator has been accomplished beginning with the initial burst of energy from the line input signal. Simultaneous with the action of up-down counter 36, second detection signal D is coupled to correlator 34. Correlator 34 detects a phase relationship between consecutive cycles. When the phase reverses, signal D provides two consecutive pulses of the same polarity. When no phase reversal occurs, signal D provides alternating pulses. Therefore, correlator 34 provides the binary demodulated output signal D' which is coupled to storage register 42. When the valid data signal is present, synchronized demodulated data can be transferred out of storage register 42. Similarly, correlator 34 can be adapted to demodulate a line input signal by detecting a frequency relationship between predetermined bit intervals of first detection signal D. Frequency demodulation may be accomplished by correlator 34 if the modulated line input signal utilizes conventional FSK modulation instead of DPSK modulation.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A circuit for synchronizing the demodulation of phase modulated transmission bursts, each burst having a predetermined number of bit intervals, by demodulating an AC component of a first signal containing said bursts, comprising:

input means for receiving said first signal, and for providing a second signal proportional to the AC component of said first signal;

window detection means coupled to said input means, for receiving the second signal, and providing a first detection signal when the amplitude of said second signal exceeds predetermined positive and negative half cycle threshold levels and a second detection signal of predetermined positive and negative levels in response to said second signal varying above and below, respectively, a reference voltage;

integration and threshold detection means coupled to said window detection means, for receiving said first detection signal, for providing an integration signal the level of which is an integration over time of said first detection signal, and for providing a sync detect signal, indicative of the detection of said second signal, in response to said integration signal exceeding a predetermined synchronization threshold level;

correlation means coupled to said window detection means, for receiving said second detection signal, detecting a phase relationship between predetermined bit intervals of said second detection signal, and providing a data bit representing a demodulated output signal which is indicative of said phase relationship for each of said bit intervals;

storage means coupled to said correlation means, for receiving said data bits, and storing a predetermined number of the most recently received of said data bits; and pulse shaping means coupled to said threshold detection means, for receiving said sync detect signal and for providing a valid data signal which is indicative of both the acquisition of synchronization and the validity of the data bits stored in said storage means.

2. The circuit of claim 1 wherein said window detection means comprise:

a first comparator having a first input coupled to an output of said input means, a second input coupled to a positive threshold voltage representing said positive half cycle threshold level, and an output, for providing a third signal when the amplitude of said second signal exceeds the positive threshold voltage;

a second comparator having a first input coupled to the output of said input means, a second input coupled to a negative threshold voltage representing said negative half cycle threshold level, and an output, for providing a fourth signal when the amplitude of said second signal exceeds the negative threshold voltage;

logic means having a first input coupled to said third signal, a second input coupled to said fourth signal, and an output, for providing said first detection signal; and a third comparator having a first input coupled to the output of said input means, a second input coupled to said reference voltage, and an output for providing said second detection signal.

3. The circuit of claim 1 wherein said storage means comprise a storage register.

4. The circuit of claim 1 wherein said pulse shaping means provide the valid data signal in response to the presence of the sync detect signal for at least a predetermined number of bit intervals.

5. The circuit of claims 1 or 2 wherein said pulse shaping means comprise a filter.

6. The circuit of claim 2 wherein said logic means comprise an OR gate.

7. The circuit of claim 2 wherein said integration and threshold detection means comprise:

a counter having an input coupled to the output of said logic means and an output coupled to the pulse shaping means, for integrating the first detection signal by counting the duration of said first detection signal and providing said sync detect signal in response to the integration signal exceeding the predetermined synchronization threshold level.

8. A method of synchronizing the demodulation of modulated phase transmission bursts, each burst having a predetermined number of bit intervals, by demodulating an AC component of a first signal containing said bursts, comprising the steps of:

receiving said first signal and providing a second signal proportional to the AC component of said first signal;

providing a first detection signal when the amplitude of said second signal exceeds predetermined positive and negative half cycle threshold levels;

providing a second detection signal in response to said second signal varying above and below a reference voltage;

integrating said first detection signal and providing an integration signal, the level of which is an integration over time of said detection signal;

providing a sync detect signal indicative of the detection of said first signal in response to said integration signal exceeding a predetermined synchronization threshold level;

detecting a phase relationship between predetermined bit intervals of said second detection signal, and providing a data bit representing a demodulation output signal which is indicative of said detected phase relationship for each of said bit intervals;

storing a predetermined number of the most recently received of said data bits; and providing a valid data signal indicative of both the acquisition of synchronization and the validity of the data bits stored in response to the presence of said sync detect signal for at least said predetermined number of bit intervals.

* * * * *